Aug. 7, 1962     B. L. HINKLE     3,048,579
PROCESS FOR TREATING VISCOSE
Filed Oct. 29, 1959
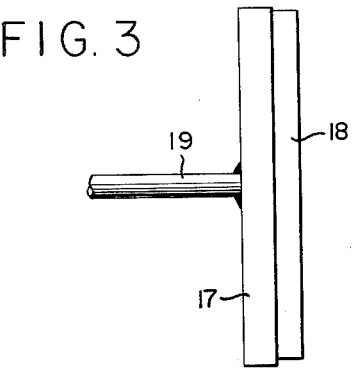
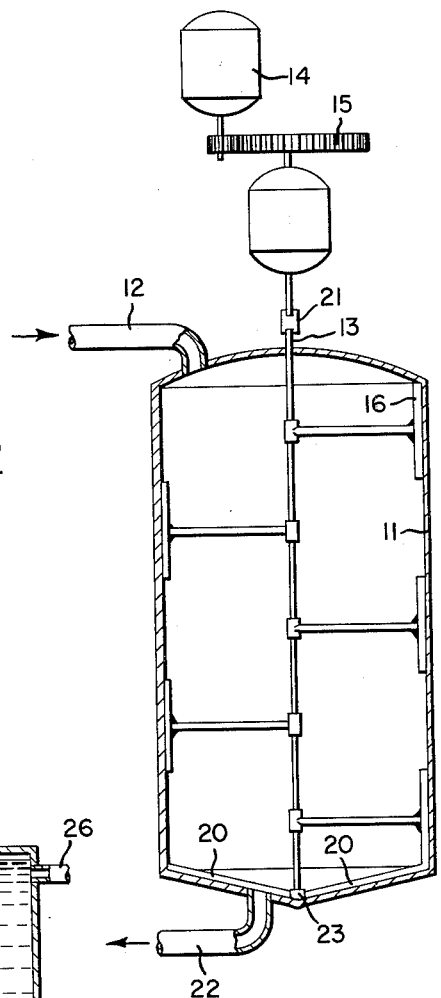
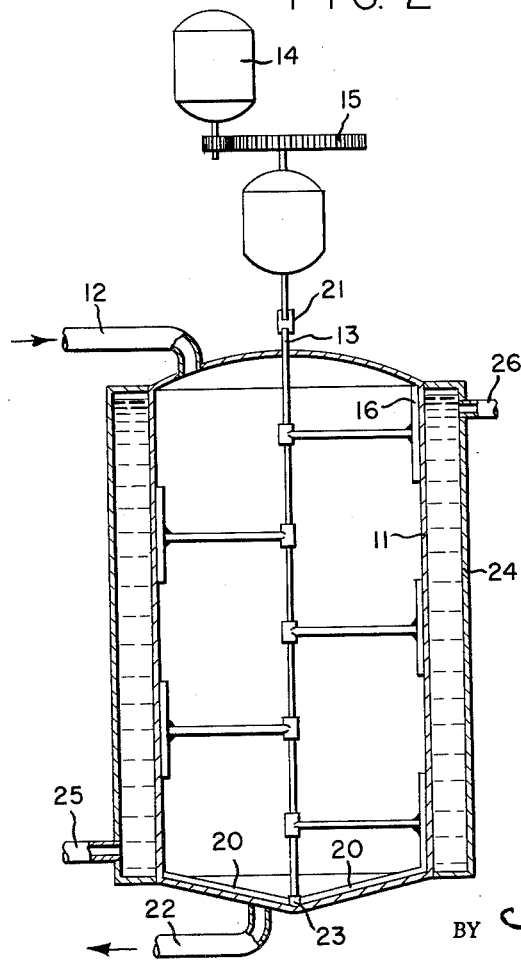
INVENTOR
BARTON L. HINKLE
BY *Herbert M Wolfson*
ATTORNEY 3,048,579
PROCESS FOR TREATING VISCOSE
Barton L. Hinkle, Richmond, Va., assignor to E. I. du Pont de Nemours and Company, Wilmington, Del., a corporation of Delaware
Filed Oct. 29, 1959, Ser. No. 849,531
1 Claim. (Cl. 260—218)

This invention relates to the manufacture of regenerated cellulose structures. More particularly, it relates to an improvement in the preparation of the viscose solution used in the process.

This application is a continuation-in-part of my co-pending application Serial No. 676,855, filed August 7, 1957.

In the manufacture of regenerated cellulose structures, a viscose solution is extruded into an acid-sulfate bath wherein the viscose solution is coagulated and regenerated to provide a regenerated cellulose structure in the form of a film, filament and the like. To provide the viscose solution for extrusion, alkali cellulose is first prepared by soaking sheets of wood pulp or cotton linters cellulose in caustic alkali solution. Excess caustic is permitted to drain from the saturated sheets and then is pressed from the sheets. The resulting alkali cellulose is shredded and aged to provide the desired viscosity in the ultimate viscose solution. The aged alkali cellulose shreds are then placed in a rotatable drum. Carbon disulfide is added; the drum is rotated and the alkali cellulose is thus xanthated. After completion of xanthation the resulting cellulose xanthate crumbs are emptied into a conventional viscose mixer in a tank containing a dilute aqueous sodium hydroxide solution. The amount and concentration of sodium hydroxide solution are such as to provide a viscose solution containing from 4–15% cellulose and from 4–10% caustic in the final mixture. The resulting viscose solution is filtered and then placed in a tank where it is permitted to ripen. The ripening step consists of storing the viscose in the tank at a temperature of about 15°–20° C. usually for several days until it has reached the predetermined desired degree of ripeness. The degree of ripeness is a measure of the ease with which the viscose will be converted into regenerated cellulose structures in the subsequent extrusion step. Deaeration of the viscose may also occur during this step.

The ripening step, as it has heretofore been performed, is a time consuming and expensive operation. During this step, a skin of gel viscose gradually builds up on the walls of the ripening tank and solidifies. At regular intervals these tanks must be taken out of service and cleaned. Heretofore a continuous operation has not been feasible because of this necessity of periodic cleaning with resulting interruptions in the continuous process.

Furthermore, the viscose produced in continuous ripening has not been uniform. The salt index, a measure of the ripening accomplished and the ease of coagulation to be expected in the ensuring steps, is usually lowest at the periphery of the flowing viscose (i.e., at the wall of the vessel) and increases as the central portion of the viscose is approached. The results encountered by using viscose that does not exhibit a uniform ripening profile are reflected in difficulties during extrusion and in the poor properties, particularly strength, in the resulting non-uniform regenerated cellulose product. The regenerated cellulose films produced from non-uniform viscoses display an unusualy high quantity of streaks; they tend to tear during treatment or use. In an effort to overcome this shortcoming, the industry has resorted to complicating blending procedures and harsh mixing treatments.

An object of the present invention is an improved process for ripening viscose that obviates the difficulties encountered in prior processes. A further object is a continuous process that can be used to provide a viscose displaying a substantially uniform ripening profile, i.e., the salt index at any point in any plane orthogonal to the direction of flow of the viscose does not differ by more than 0.3 index unit from the salt index at any other point in the same plane. Other objects will appear hereinafter.

The objects are accomplished by a continuous process which comprises feeding the viscose to be ripened through an enclosure, a tank or pipe or the like, at a predetermined average linear velocity, usually 5–40 feet per hour (.083.–.67 foot per minute) and scraping the walls of said enclosure at a rate equal to at least 15 times, preferably 15 times to 50 times, the average linear velocity of the viscose solution through the enclosure.

The process may be performed in a tank, preferably water jacketed, in which means are provided to scrape the walls and the bottom surface of the tank, the rate of scraping being related to the average linear velocity of the viscose as stated above.

The invention will be better understood by referring to the detailed description in conjunction with the accompanying illustrations in which:

FIGURE 1 is a vertical sectional view of an embodiment of the ripening apparatus suitable for use in accordance with the present invention;

FIGURE 2 is a vertical sectional view of another embodiment of the apparatus of the invention; and FIGURE 3 is an enlarged sectional view of a wall scraping unit of the apparatus.

Referring to the drawings, reference numeral 11 designates a viscose ripening tank. The viscose is brought from the previous operation, the so-called mixing operation in which the cellulose xanthate has been dispersed in a dilute alkali solution, into the ripening tank 11 through a conduit 12 in the top of the tank. Through the top of the tank is also disposed a centrally located rotatable shaft 13. The shaft is driven in any desired manner such as a motor 14, as shown, through a speed reducer 15, so that the motor and speed reducer comprise a variable speed drive unit. The shaft is attached to the drive unit by the coupling 21. Connected to the shaft 13 are a plurality of scraping units 16 each composed of folded stainless steel strips 17 with rubber strips 18 secured between the folded steel strips. The rubber strips 18 extend beyond the edge of the folded steel strips 17 to contact the inner surface of tank 11. The stainless steel strips 17 are attached to the central shaft 13 by means of stainless steel tubing 19. The scraping unit attached to the lower extremity of the shaft is composed of folded steel strips 20 and rubber strips but no connecting tube such as 19 is necessary since the steel strips 20 are attached directly to the shaft. The shaft 13 is seated in the tank 11 at recess 23. The viscose leaves the apparatus through the outlet 22. The ripened viscose is led from the outlet to the extrusion apparatus not shown. As indicated in FIGURE 2, the apparatus may be provided with a jacket 24 through which water, brine or other cooling liquid may be circulated from inlet 25 to outlet 26 to maintain the viscose at the desired ripening temperature, usually from 15°–20° C.

EXAMPLE 1

In practice, the viscose at 34° C. was fed through the tank shown in FIGURE 1 at the rate of 2.46 gallons per hour, the tank measuring 9½ inches in diameter and 4 feet in height, i.e., at an average linear velocity of 0.67 foot per hour (0.0112 foot per minute). The ripening time for the viscose was 6 hours. Under these conditions and with the central shaft rotating at a speed of ⅙ revolution per minute or 0.415 foot per minute, no build-up of gel viscose on the tank wall was observed after four weeks of continuous operation.

In a control operated under identical conditions but without the use of the scraping unit of the present invention, the gel viscose built up on the walls to a thickness of up to 2 inches within a four week period.

However, the most surprising result is evident from the following table, Table 1, in which the salt index values of viscose samples are presented for samples obtained from a tank utilizing the present invention and samples from a conventional operation. The samples were taken by inserting a sample tube at different points across the outlet end of the tank.

Table 1

| Elapsed Time (Weeks) | Salt Index [1] With Invention | | Salt Index [1] of Control | |
|---|---|---|---|---|
| | Center | Periphery | Center | Periphery |
| 0.5 | 3.8 | 3.8 | 3.1 | 2.6 |
| 1 | 2.4 | 2.4 | 2.6 | 2.3 |
| 1.5 | 3.0 | 3.0 | 2.7 | 2.5 |
| 2 | 2.8 | 2.9 | 2.8 | 2.3 |
| 2.5 | 2.9 | 2.9 | 3.1 | 2.4 |
| 3 | 3.1 | 3.1 | 2.9 | 2.4 |
| 3.5 | 2.8 | 2.7 | 2.7 | 2.4 |
| 4 | 2.4 | 2.5 | 2.9 | 2.5 |

[1] As determined in the manner described on page 68 of "Artificial Silk" by Reinthaler and Rowe.

Over the four-week period the difference in salt index between the center and periphery was negligible when ripening was conducted in the apparatus of the present invention. The greatest difference in the four-week period was 0.1 unit and the average difference over the period was less than 0.04 unit. Without the present improvement, the difference in salt index over the period ranged from 0.2 to 0.7 unit, the average being over 0.4 unit.

EXAMPLE 2

Viscose at 34° C. was fed through the tank used in Example 1 at the same rate used in Example 1, i.e., at the rate of 2.46 gallons per hour, the tank measuring 9½ inches in diameter and 4 feet in height, i.e., at an average linear velocity of 0.67 foot per hour (0.0112 foot per minute). The ripening time for the viscose was 6 hours. Under these conditions and with the central shaft rotating at a speed of 1/15 revolution per minute or 0.618 foot per minute no build-up of gel viscose on the tank wall was observed after four weeks of continuous operation.

The salt index profile over the four-week period is given in Table 2, the control results being the same as those in Example 1.

Table 2

| Elapsed Time (Weeks) | Salt Index With Invention | | Salt Index of Control | |
|---|---|---|---|---|
| | Center | Periphery | Center | Periphery |
| 0.5 | 2.7 | 2.5 | 3.1 | 2.6 |
| 1 | 2.9 | 2.8 | 2.6 | 2.3 |
| 1.5 | 3.2 | 3.0 | 2.7 | 2.5 |
| 2 | 2.6 | 2.6 | 2.8 | 2.3 |
| 2.5 | 2.8 | 2.8 | 3.1 | 2.4 |
| 3 | 2.9 | 2.9 | 2.9 | 2.4 |
| 3.5 | 2.7 | 2.4 | 2.7 | 2.4 |
| 4 | 3.0 | 2.9 | 2.9 | 2.5 |

Over the four-week period the greatest difference in salt index between the center and periphery was 0.3 unit and the average difference was 0.11 unit compared to a greatest difference of 0.7 unit and an average difference of 0.42 for the control.

In Example 1, the improvement was obtained with the scraper speed at ⅙ revolution per minute being about 37 times the average linear velocity of the viscose (0.67 foot per hour). However, benefits can be obtained with the scraper speed being at least 15 times the average viscose throughput in feet per minute as shown in the results of Example 2. It should be noted that the uniformity of salt index at the ratio used in Example 1 (37:1) is more than satisfactory. This excellent result persists as the scraper speed is increased to a ratio of about 50:1 (scraper speed-to-average linear velocity of viscose. Thus, with ratios of scraper speed-to-average linear viscose velocity of 15:1 to 50:1 in accordance with the present invention, uniform ripening profiles are obtained wherein the salt index at any point in any plane orthogonal or transverse to the direction of flow of viscose solution does not differ by more than 0.3 index unit (or less than about 10%) from the salt index at any other point in the same plane. These results are independent of viscose throughput, being applicable to average viscose linear velocities ranging from 0.5–40 feet per hour.

As materials for use in the scrapers of the invention stainless steel and rubber have been mentioned. However, for stainless steel, any of the following materials may be substituted: common carbon steel, plastics, or any other rigid member resistant to caustic and carbon disulfide. For the rubber used in the scraping units, any of the following materials may be substituted: "Teflon" (polytetrafluoroethylene), nylon, neoprene, or any other flexible material resistant to caustic and carbon disulfide.

The process is particularly advantageous in permitting the continuous ripening of viscose in the production of regenerated cellulose films, filaments, foils, etc. It has been found possible by use of the present invention to use higher ripening temperatures and thus, in many cases, avoid the necessity of cooling equipment. The higher ripening temperatures may be used to obtain shorter hold-up times without the previously-encountered increased rate of gel build-up on the walls of the ripening vessel.

Besides eliminating the build-up of gel on the walls of the ripening tank, it has been found that the ripened viscose displays a surprisingly uniform ripening profile. Uniformity of the product, which is dependent on the uniformity of the raw material, has been an elusive goal, particularly for the regenerated cellulose film industry. The present invention, by providing this uniformity without adding any complication or expense to the process, makes a substantial contribution to the field.

Having fully disclosed the invention, what is claimed is:

A process for continuously ripening viscose which comprises feeding the viscose at a temperature for ripening and at a predetermined linear velocity through an enclosure wherein said viscose ripens to the predetermined degree of ripeness and scraping the walls of said enclosure at a rate equal to 15–50 times the average linear velocity of the viscose through the enclosure.

References Cited in the file of this patent

UNITED STATES PATENTS

| 1,465,752 | Yates | Aug. 21, 1923 |
| 1,785,025 | Evans | Dec. 16, 1930 |

FOREIGN PATENTS

| 722,827 | Great Britain | Feb. 2, 1955 |
| 722,890 | Great Britain | Feb. 2, 1955 |